US009069500B2

(12) United States Patent
Ito

(10) Patent No.: US 9,069,500 B2
(45) Date of Patent: Jun. 30, 2015

(54) INFORMATION PROCESSING DEVICE, METHOD AND COMPUTER-READABLE MEDIUM THEREFOR CONFIGURED TO GENERATE TRANSMISSION INFORMATION ASSOCIATED WITH SELECTED TARGET SPREADSHEETS

(71) Applicant: BROTHER KOGYO KABUSHIKI KAISHA, Nagoya-shi, Aichi-ken (JP)

(72) Inventor: Chitoshi Ito, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/333,773

(22) Filed: Jul. 17, 2014

(65) Prior Publication Data

US 2015/0029528 A1    Jan. 29, 2015

(30) Foreign Application Priority Data

Jul. 25, 2013   (JP) ................................ 2013-154327

(51) Int. Cl.
G06F 3/12    (2006.01)
(52) U.S. Cl.
CPC ............ *G06F 3/1213* (2013.01); *G06F 3/1246* (2013.01); *G06F 3/1204* (2013.01); *G06F 3/1298* (2013.01)
(58) Field of Classification Search
USPC ................................ 358/1.1–3.29, 1.11–1.18
See application file for complete search history.

(56) References Cited

U.S. PATENT DOCUMENTS

| 2008/0024820 A1* | 1/2008 | Ohtomo ...................... 358/1.15 |
| 2009/0327213 A1* | 12/2009 | Choudhary ...................... 707/2 |
| 2012/0151378 A1* | 6/2012 | Parish et al. ................... 715/751 |

FOREIGN PATENT DOCUMENTS

| JP | 2004-334674 A | 11/2004 | | |
| JP | 2004334674 | * 11/2004 | ............... B41J 29/38 |
| JP | 2008-33460 A | 2/2006 | | |
| JP | 2008033460 | * 2/2014 | ............... G06F 3/12 |

* cited by examiner

*Primary Examiner* — Marcellus Augustin
(74) *Attorney, Agent, or Firm* — Merchant & Gould PC

(57) ABSTRACT

An information processing device including a communication unit communicating with a conversion device, and a control unit configured to select one or more target spreadsheets from among spreadsheets contained in target information, the target information being described in a format of a markup language and contains the spreadsheets, each of the spreadsheets being individually identified based on tag information contained in the target information, generate transmission information based on the one or more selected target spreadsheets, control the communication unit to transmit the generated transmission information to the conversion device, and control the communication unit to receive one or more pieces of image information from the conversion device, each of the one or more pieces of image information being generated through conversion by the conversion device based on a corresponding one of the one or more selected target spreadsheets included in the transmission information transmitted to the conversion device.

14 Claims, 8 Drawing Sheets

81 — Number of Sheets = 2
82 { 82a — Print1Name = "Sheet1"
     82b — Print1Jpeg = "Sheet1.jpg"
82 { 82a — Print2Name = "Sheet3"
     82b — Print2Jpeg = "Sheet3.jpg"

INFORMATION PROCESSING DEVICE, METHOD AND COMPUTER-READABLE MEDIUM THEREFOR CONFIGURED TO GENERATE TRANSMISSION INFORMATION ASSOCIATED WITH SELECTED TARGET SPREADSHEETS

CROSS-REFERENCE TO RELATED APPLICATION

This application claims priority under 35 U.S.C. §119 from Japanese Patent Application No. 2013-154327 filed on Jul. 25, 2013. The entire subject matter of the application is incorporated herein by reference.

BACKGROUND

1. Technical Field

The following description relates to one or more techniques for information processing devices, and methods and computer-readable media therefor.

2. Related Art

A technique has been known in which a terminal device is configured to determine whether data input into the terminal device is of a format displayable on the terminal device. Further, when determining that the input data is of the displayable format, the terminal device displays the input data as it is. Meanwhile, when determining that the input data is not of the displayable format, the terminal device transmits the input data to a server, and then receives, from the server, format-converted data into which the data of the original format has been converted.

SUMMARY

According to the known technique, for instance, by converting the input data into image data on the server, it is possible to output contents of the input data as an image printed based on the image data, regardless of the format of the input data. However, when the input data contains data of a plurality of spreadsheets (hereinafter, which may be referred to as sheets), even if a user wishes to print some of the plurality of sheets, all the sheets contained in the input data are transmitted to the server. Therefore, it takes a long time for the terminal device to receive the image data after conversion from the server.

Aspects of the present disclosure are advantageous to provide one or more improved techniques that make it possible to reduce a time period required for receiving image information after conversion, when target information containing a plurality of sheets is transmitted to a conversion device and then converted into the image information by the conversion device.

According to aspects of the present disclosure, an information processing device is provided, which includes a communication unit configured to communicate with a conversion device, and a control unit configured to select one or more target spreadsheets from among a plurality of spreadsheets contained in target information, the target information being described in a format of a markup language and containing the plurality of spreadsheets, each of the plurality of spreadsheets being individually identified based on tag information contained in the target information, generate transmission information, based on the one or more selected target spreadsheets, control the communication unit to transmit the generated transmission information to the conversion device, and control the communication unit to receive one or more pieces of image information from the conversion device, each of the one or more pieces of image information being generated through conversion by the conversion device based on a corresponding one of the one or more selected target spreadsheets included in the generated transmission information transmitted to the conversion device.

According to aspects of the present disclosure, further provided is a method adapted to be implemented on a processor, including selecting one or more target spreadsheets from among a plurality of spreadsheets contained in target information, the target information being described in a format of a markup language and containing the plurality of spreadsheets, each of the plurality of spreadsheets being individually identified based on tag information contained in the target information, generating transmission information, based on the one or more selected target spreadsheets, transmitting the generated transmission information to the conversion device, and receiving one or more pieces of image information from the conversion device, each of the one or more pieces of image information being generated through conversion by the conversion device based on a corresponding one of the one or more selected target spreadsheets included in the generated transmission information transmitted to the conversion device.

According to aspects of the present disclosure, further provided is a non-transitory computer-readable medium storing computer-readable instructions that are executable by a processor coupled with a communication unit configured to communicate with a conversion device, the instructions being configured to, when executed by the processor, cause the processor to select one or more target spreadsheets from among a plurality of spreadsheets contained in target information, the target information being described in a format of a markup language and containing the plurality of spreadsheets, each of the plurality of spreadsheets being individually identified based on tag information contained in the target information, generate transmission information, based on the one or more selected target spreadsheets, control the communication unit to transmit the generated transmission information to the conversion device, and control the communication unit to receive one or more pieces of image information from the conversion device, each of the one or more pieces of image information being generated through conversion by the conversion device based on a corresponding one of the one or more selected target spreadsheets included in the generated transmission information transmitted to the conversion device.

It is noted that, in the present disclosure, the term "information" may be used as a broader concept than the term "data." Therefore, for instance, "A data" may be replaced with "A information." Further, "B data," which is a copy of "A data" or generated by converting "A data," may be equivalent to "A information," as far as "B data" is used as having the same meaning as "A data."

BRIEF DESCRIPTION OF THE ACCOMPANYING DRAWINGS

Figure 2A:
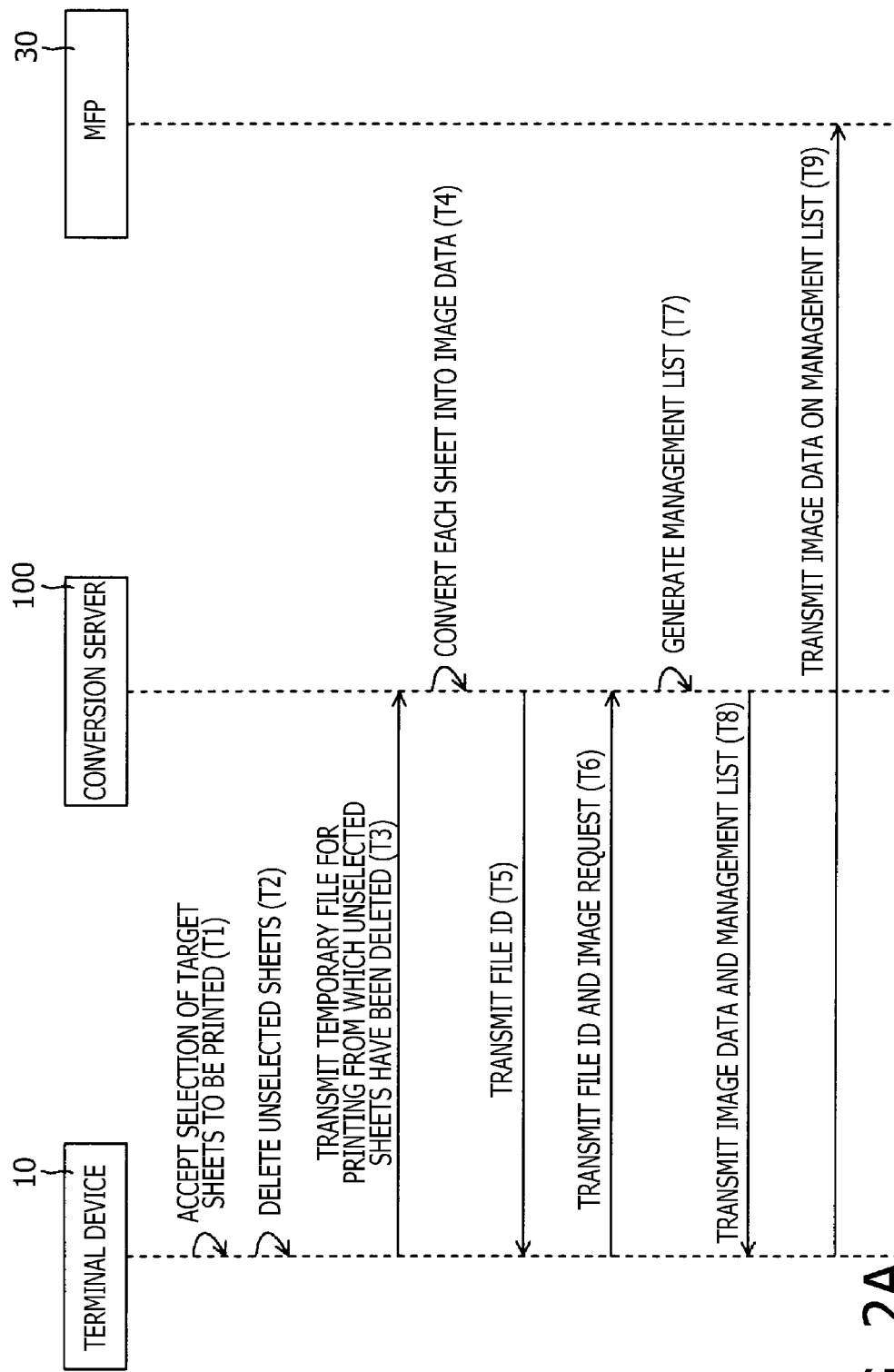
FIG. 2A shows a sequence of major operations to be executed by the terminal device and a conversion server in the first illustrative embodiment according to one or more aspects of the present disclosure.
Figures 2B, 2C:
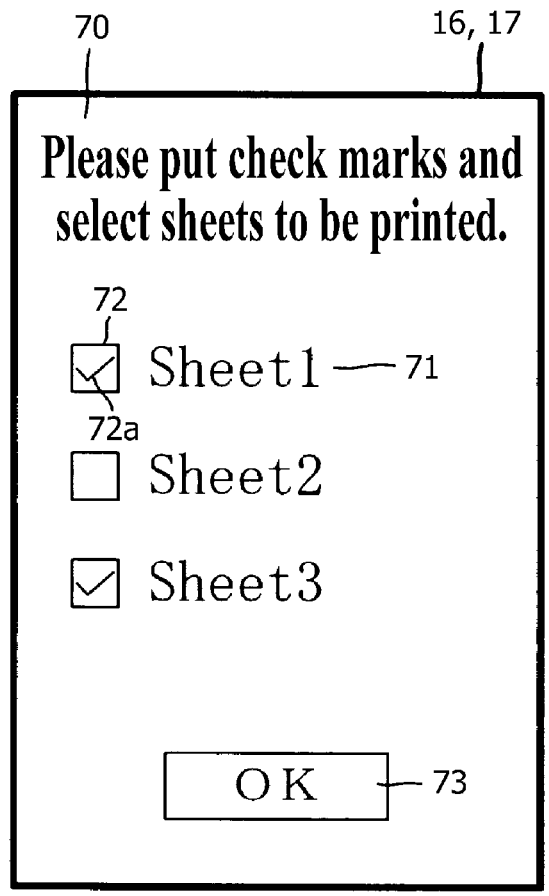

FIG. 2B exemplifies a sheet selection screen displayed on the terminal device in the first illustrative embodiment according to one or more aspects of the present disclosure.

FIG. 2C exemplifies a management list generated by the conversion server in the first illustrative embodiment according to one or more aspects of the present disclosure.

Figure 3A:
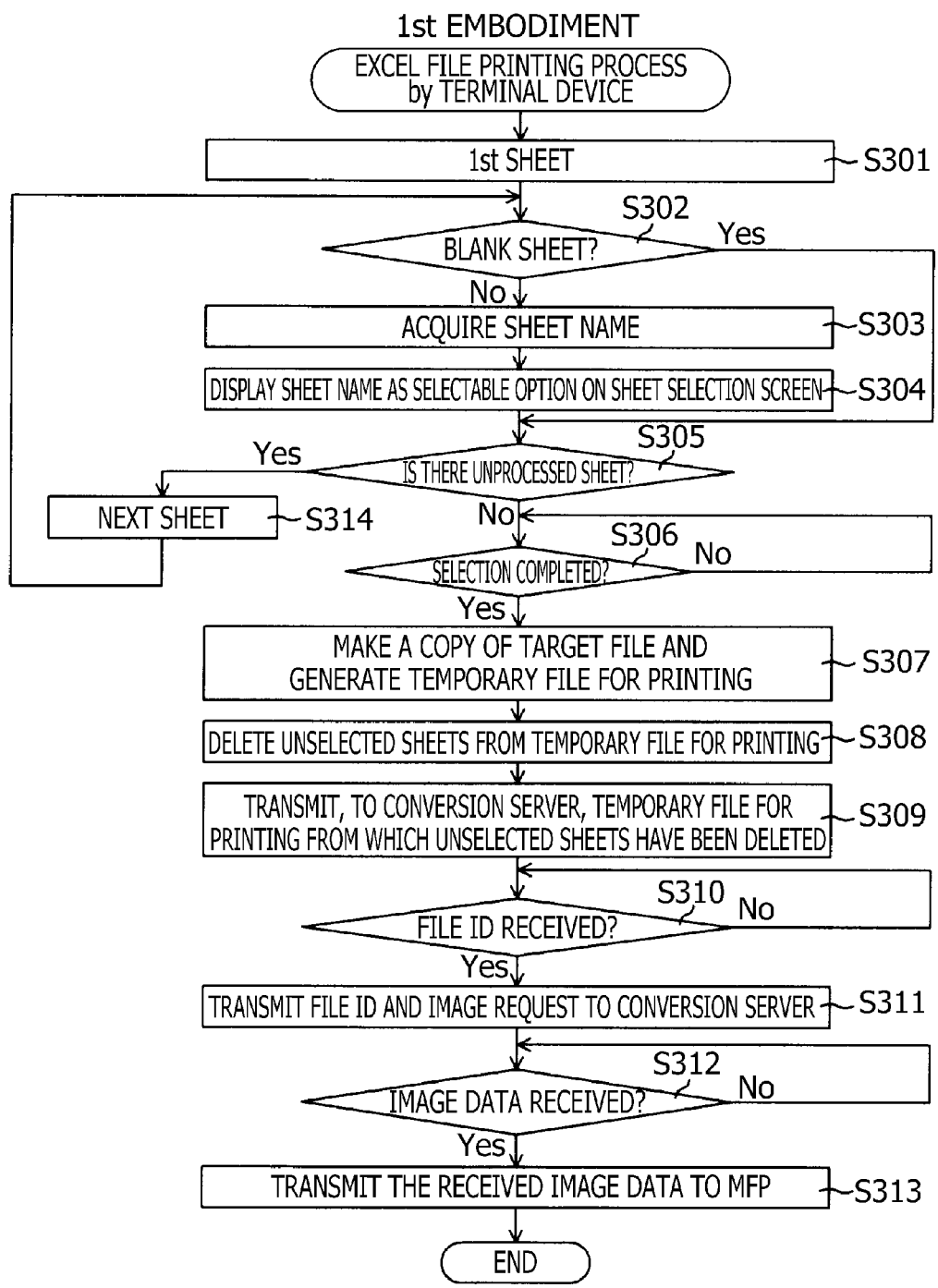

FIG. 3A is a flowchart showing an Excel file printing process to be executed by the terminal device in the first illustrative embodiment according to one or more aspects of the present disclosure.

Figure 3B:
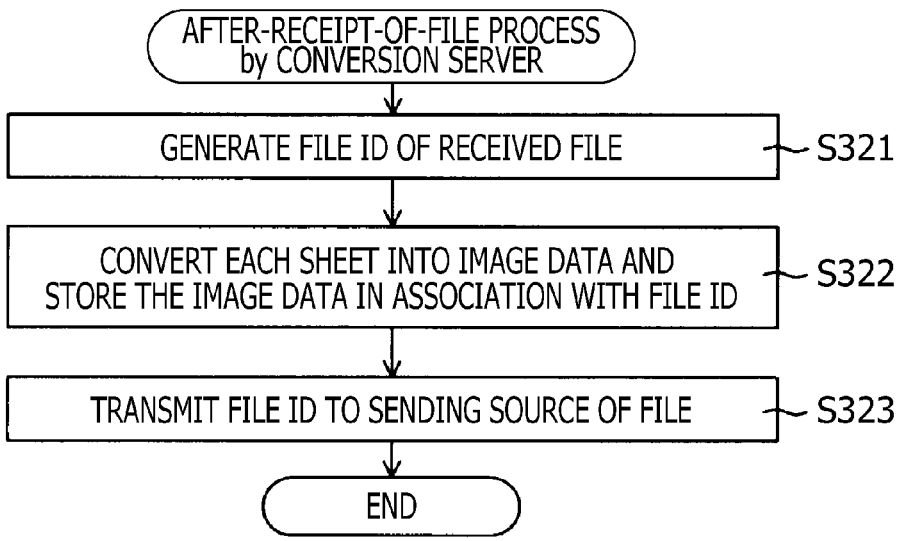

FIG. 3B is a flowchart showing an after-receipt-of-file process to be executed by the conversion server in the first illustrative embodiment according to one or more aspects of the present disclosure.

Figure 3C:
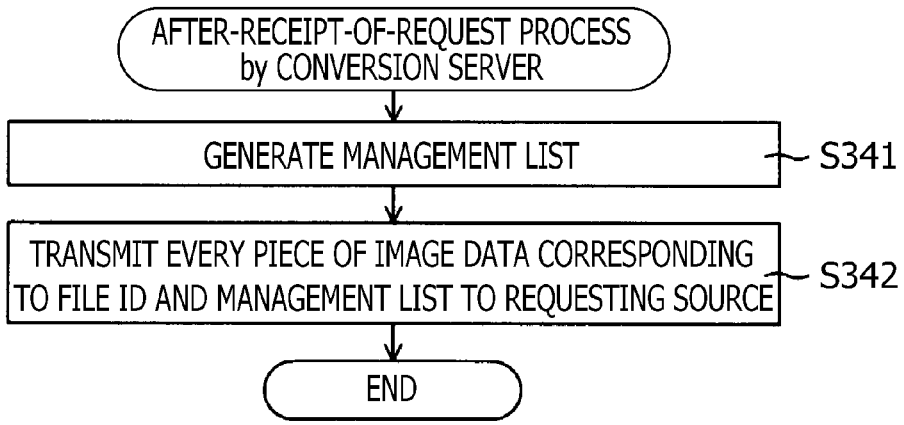

FIG. 3C is a flowchart showing an after-receipt-of-request process to be executed by the conversion server in the first illustrative embodiment according to one or more aspects of the present disclosure.

Figure 4A:
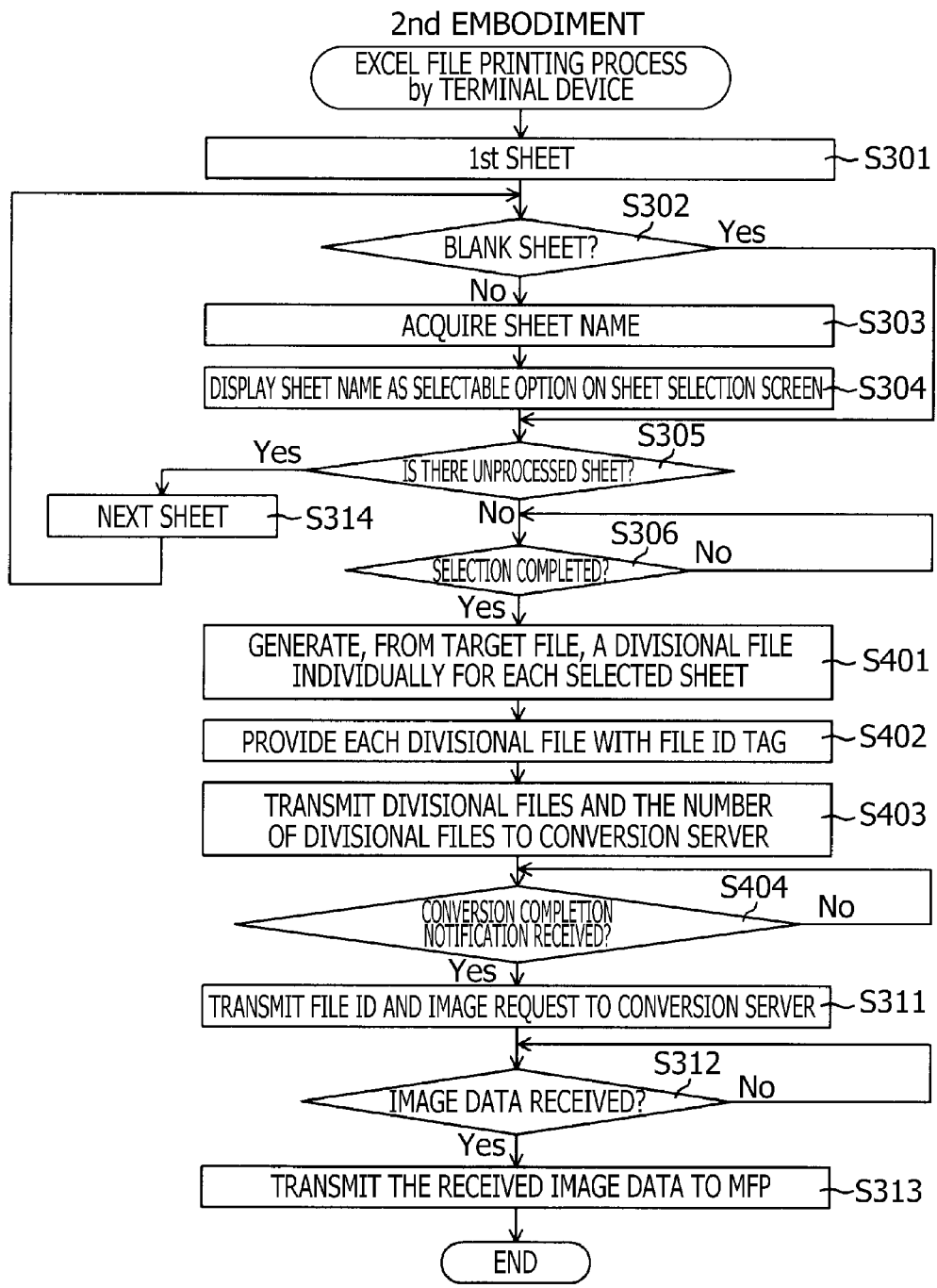

FIG. 4A is a flowchart showing an Excel file printing process to be executed by the terminal device in a second illustrative embodiment according to one or more aspects of the present disclosure.

Figure 4B:
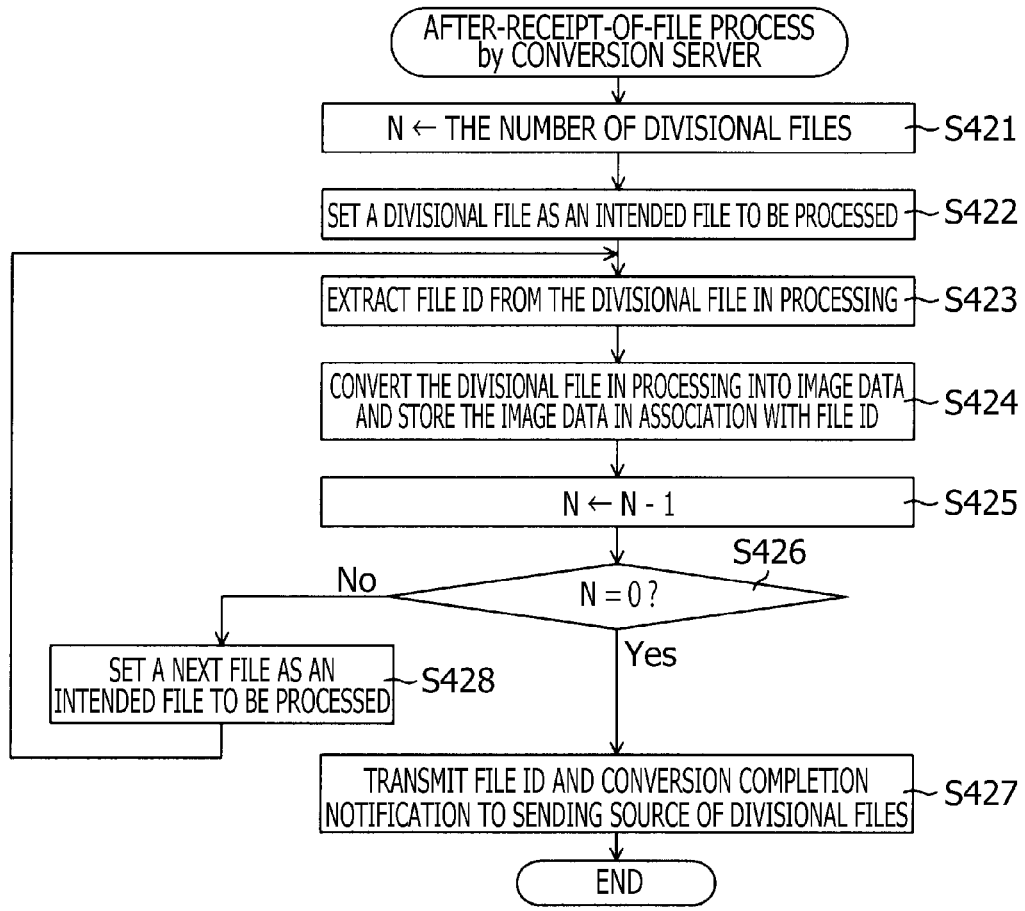

FIG. 4B is a flowchart showing an after-receipt-of-file process to be executed by the conversion server in the second illustrative embodiment according to one or more aspects of the present disclosure.

Figure 5:
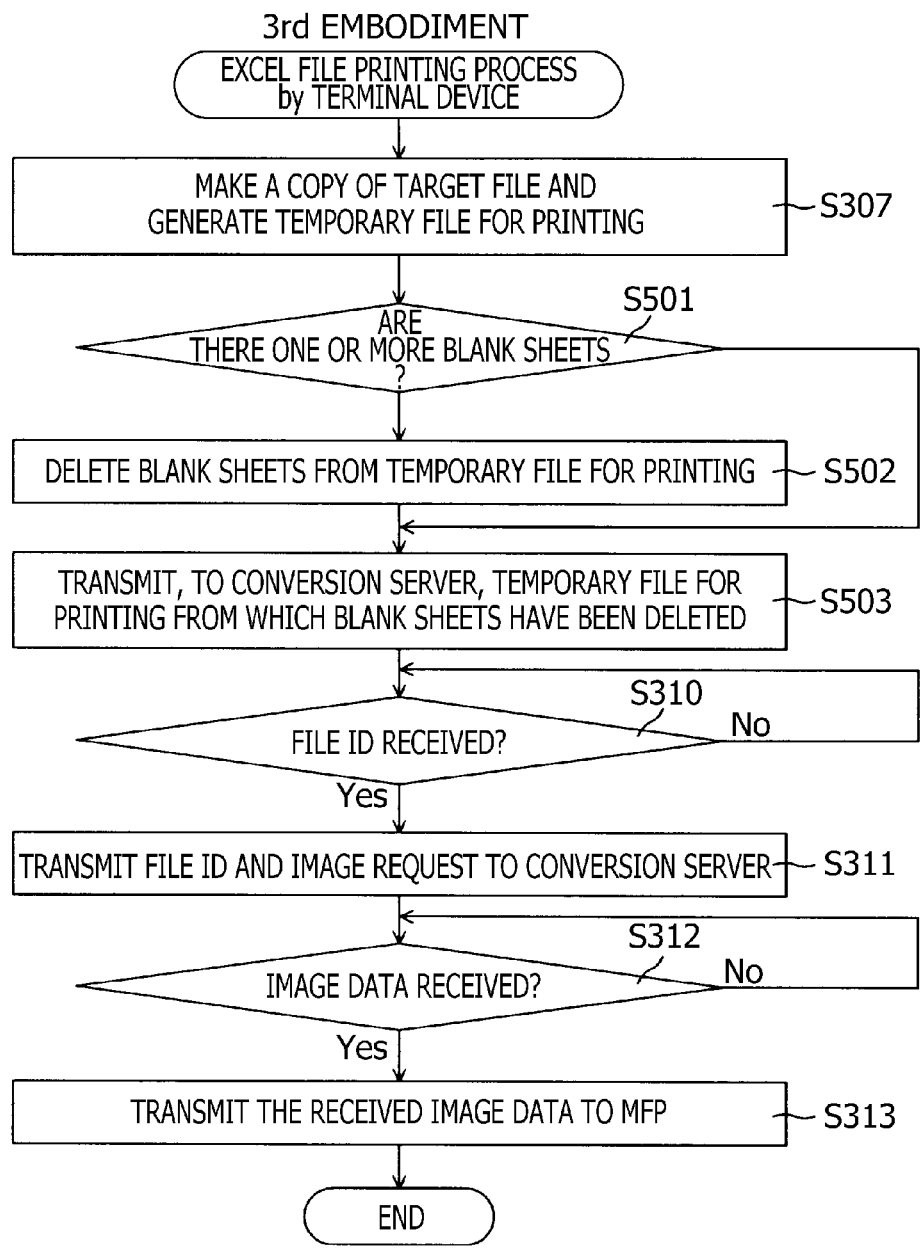

FIG. 5 is a flowchart showing an Excel file printing process to be executed by the terminal device in a third illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

Figure 1:
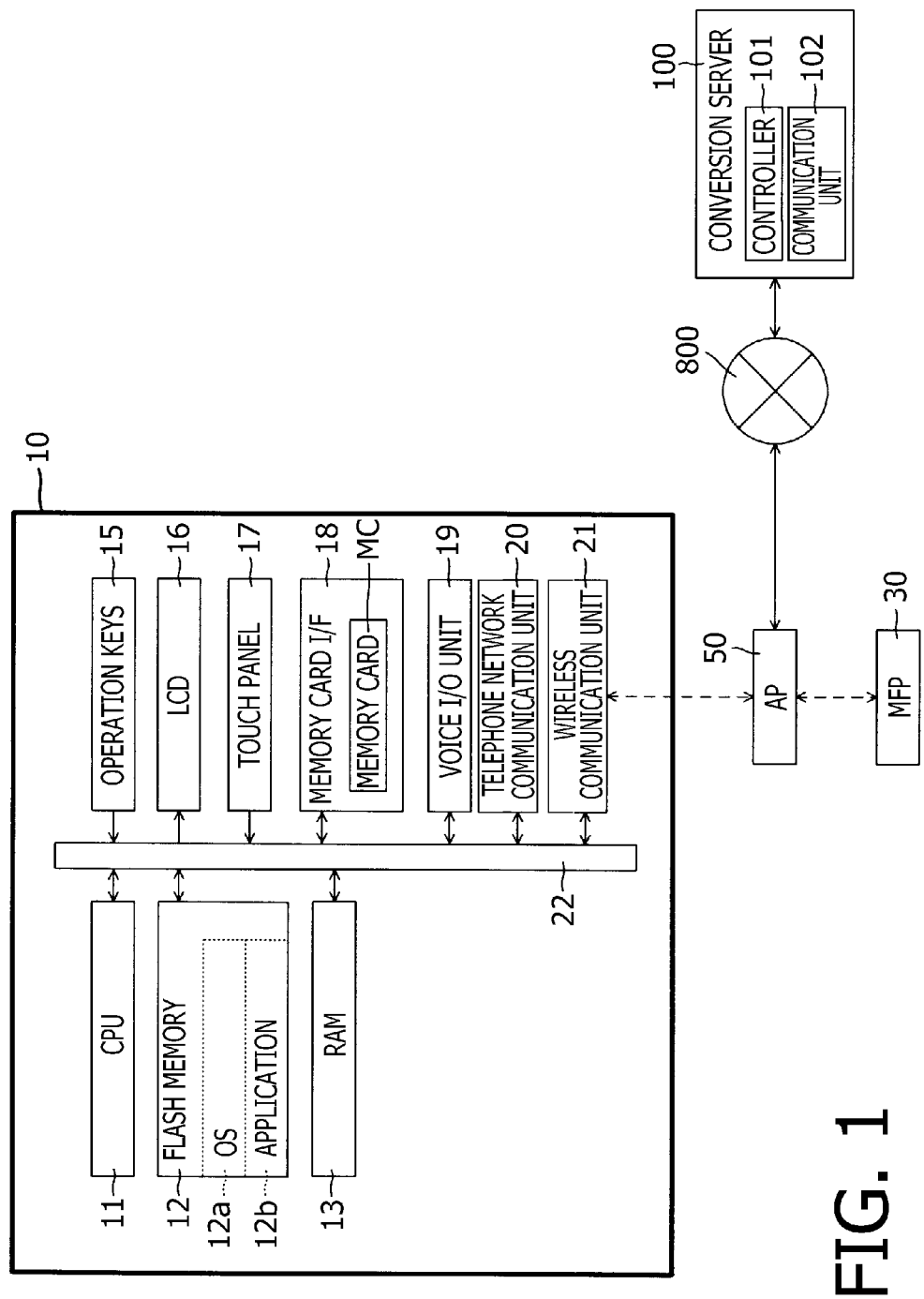
FIG. 1 is a block diagram showing an electrical configuration of a terminal device in a first illustrative embodiment according to one or more aspects of the present disclosure.

FIG. 1 is a block diagram showing an electrical configuration of a terminal device 10 storing therein an application program 12b (hereinafter, which may be referred to as an application 12b) in a first illustrative embodiment according to aspects of the present disclosure.

The application 12b is configured to, when a user instructs the application 12b to print a data file (hereinafter referred to as an Excel file) generated by a Microsoft Excel® (trademark registered by the Microsoft Corporation), upload the Excel file selected by the user onto a conversion server 100 and cause the conversion server to convert the Excel file into image data. Further, the application 12b is configured to download the image data after conversion and cause a multifunction peripheral 30 (hereinafter referred to as an MFP 30) to print an image based on the image data with a printing function of the MFP 30. As will be described in detail, in particular, the application 12b of the first illustrative embodiment is configured to reduce a time period required for the printing process.

It is noted that Excel files to be employed in the first illustrative embodiment are files based on an extensible markup language format (hereinafter referred to as an XML format). An XML-format Excel file includes document data written in a markup language. In the XML-format Excel file, a document structure (e.g., a document structure of a "sheet") is expressed using specific character strings referred to as "tags."

The terminal device 10 of the first illustrative embodiment may be a mobile terminal device such as a smartphone. The terminal device 10 includes a central processing unit 11 (hereinafter referred to as a CPU 11), a flash memory 12, a random access memory 13 (hereinafter referred to as a RAM 13), operation keys 15, a liquid crystal display 16 (hereinafter referred to as an LCD 16), a touch panel 17, a memory card interface 18 (hereinafter, which may be referred to as a memory card I/F 18), a voice input/output unit 19, a telephone network communication unit 20, and a wireless communication unit 21. The above elements included in the terminal device 10 are interconnected via a bus line 22.

The CPU 11 is configured to take control of the elements interconnected via the bus line 22, in accordance with parameters and programs stored, e.g., in the flash memory 12. The parameters may be fixed values. The flash memory 12 is a rewritable non-volatile memory. The flash memory 12 stores an operating system 12a and the application 12b. It is noted that hereinafter, an operating system may be referred to as an OS. Further, in the following descriptions, the CPU 11 that is executing a program such as the application 12b or the OS 12a may simply be referred to with a name of the program. For example, "the CPU 11 that is executing the application 12b" may be referred to as "the application 12b." In other words, there may be a case where "the application 12b" represents "the CPU 11 that is executing the application 12b." The OS 12a is basic software configured to achieve standard functions of the terminal device 10. In the first illustrative embodiment, the OS 12a may be an Android OS (Android™ is a trademark or a registered trademark of Google Inc.).

The application 12b is supplied by venders of various devices. The application 12b is installed into the terminal device 10 by the user, and allows the user to utilize a device compatible with the application 12b from the terminal device 10. In the first illustrative embodiment, the application 12b allows the user to utilize the MFP 30 from the terminal device 10. More specifically, the application 12b allows the user to perform printing by the MFP 30 under direct control from the terminal device 10, without involving any personal computers. Further, as will be described in detail later, according to the application 12b of the first illustrative embodiment, one or more sheets other than one or more sheets selected by the user as target sheets to be printed are deleted from among a plurality of sheets contained in the Excel file. Then, the Excel file containing only the sheets selected as target sheets to be printed is transmitted to the conversion server 100 as a temporary file for printing. Therefore, since the sheets not selected as target sheets to be printed are not transmitted to the conversion server 100, it is possible to shorten a time period required for the Excel file to be transmitted to the conversion server 100. Consequently, it is possible to reduce a time period required for printing of images based on the one or more sheets selected as target sheets to be printed. It is noted that each operation in a below-mentioned flowchart shown in FIG. 3 is executed by the CPU 11 in accordance with the application 12b. Further, in the flash memory 12, stored are various print settings such as a size of printing sheets and an orientation of the printing sheets in a printing operation.

It is noted that programs such as the application 12a may be stored in computer-readable media, which are non-transitory storage media but do not include electric signals as carrier waves carrying a program downloaded from a server on the Internet. The computer-readable media may include but not be limited to random access memories (hereinafter referred to as RAMs), read-only memories (hereinafter referred to as ROMs), electrically erasable programmable read-only memories (hereinafter referred to as EEPROMs), hard disk drives (hereinafter referred to as HDDs), buffers provided to the CPU 11, and a combination including two or more of the aforementioned storage media.

The RAM 13 is a rewritable volatile memory. The operation keys 15 are mechanical keys for inputting an instruction into the terminal device 10. For instance, the operation keys 15 may be provided at a housing of the terminal device 10. The LCD 16 is configured to display various screen images. The touch panel 17 is placed on top of the LCD 16. The touch panel 17 is configured to input an instruction into the terminal device 10 when an indication body such as a finger or a stick is brought into contact with or close to the touch panel 17. The memory card I/F 18 is configured such that a rewritable non-volatile memory card MC is inserted thereinto. Further, the memory card I/F 18 is configured to control reading and writing of data and files. The voice input/output unit 19 includes a microphone and a speaker. The telephone network communication unit 20 is a circuit configured to enable voice communication via a cellular phone network (not shown).

The wireless communication unit 21 is an interface configured to perform wireless communication via a wireless LAN. In the first illustrative embodiment, the wireless communication unit 21 is configured to perform wireless communication via a wireless LAN complying with IEEE 802.11b/g. Specifically, in the first illustrative embodiment, the wireless communication unit 21 is configured to perform Wi-Fi wireless communication based on Wi-Fi standards (Wi-Fi® is a trademark registered by Wi-Fi Alliance) with various devices such as the MFP 30 via an access point 50 (hereinafter, which may be referred to as an AP 50) as a relay device.

The AP 50 is a relay device for Wi-Fi communication. In addition, the AP 50 has a broadband router function, and is configured to connect with the Internet. The MFP 30 has multiple functions such as a printing function, a scanning function, a facsimile function, and a copy function. The conversion server 100 is configured to convert an Excel file uploaded from the terminal device 10 into image data of a predetermined format. Possible formats of the image data after conversion may include various formats such as JPEG, PNG, GIF, and BMP. In the first illustrative embodiment, the conversion server 100 is configured to convert an Excel file into JPEG image data. The conversion server 100 includes a controller 101 and a communication unit 102. The controller 101 includes a CPU (not shown), a ROM (not shown), and a RAM (not shown). The communication unit 102 is configured to communicably connect with the terminal device 10 via the Internet and the AP 50.

FIG. 2A shows a sequence of major operations to be executed by the terminal device 10 and the conversion server 100 in the first illustrative embodiment. In the sequence shown in FIG. 2A, operations by the CPU 11 of the terminal device 10 are executed in accordance with the application 12b. Further, operations by the controller 101 of the conversion server 100 are executed in accordance with a control program (not shown) stored in the conversion server 100. In the following descriptions, "the CPU 11 of the terminal device 10" may simply be referred to as "the terminal device 10." Likewise, "the controller 101 of the conversion server 100" may simply be referred to as "the conversion server 100."

The terminal device 10 displays a sheet selection screen 70 (see FIG. 2B) on the LCD 16, and allows the user to select one or more target sheets to be printed, from among sheets contained in an Excel file selected as a target file to be printed. It is noted that the target file is an example of target information. In response to accepting the selection of the target sheets to be printed (T1), the terminal device 10 deletes data of one or more unselected sheets from a copy of the target file (T2). The terminal device 10 transmits, to the conversion server 100, a temporary file for printing that is a file generated by deleting the data of the one or more unselected sheets from the copy of the target file (T3).

In response to receiving the temporary file for printing from the terminal device 10, the conversion server 100 converts each sheet contained in the temporary file for printing into JPEG image data (T4). The conversion server 100 generates a file ID for the temporary file for printing received from the terminal device 10, and stores, into a storage unit (not shown) thereof, the temporary file for printing in association with the generated file ID. Further, the conversion server 100 stores, into the storage unit thereof, the image data of each sheet that has been acquired by the conversion in T4, in association with a file ID assigned to the temporary file for printing before conversion.

The conversion server 100 transmits, to the terminal device 10, the file ID associated with the image data acquired through the conversion in T4 (T5). On the other hand, the terminal device 10 transmits, to the conversion server 100, the file ID received from the conversion server 100 and an image request (T6). The conversion server 100 generates a management list 80 (see FIG. 2C) for managing image data of each sheet corresponding to the file ID received along with the image request (T7). Then, the conversion server 100 generates a ZIP file that contains the management list 80 generated in T7 and the image data of each sheet corresponding to the file ID received with the image request, and transmits the generated ZIP file to the terminal device 10 (T8). In response to receipt of the ZIP file, the terminal device 10 decompresses the received ZIP file, and transmits the image data contained in the ZIP file to the MFP 30 in accordance with the management list contained in the ZIP file (T9). In response to receipt of the image data, the MFP 30 prints images based on the received image data on sheets with the printing function.

FIG. 2B schematically shows an example of the sheet selection screen 70 displayed on the LCD 16. On the sheet selection screen 70, displayed are a sheet name 71 each sheet contained in the Excel file selected as a target file to be printed and a confirmation box 72 corresponding to each sheet name 71. The sheet selection screen 70 exemplified in FIG. 2B displays the three sheet names 71 and the three confirmation boxes 72 for the three sheets.

The user is allowed to switch a selection state of each sheet identified by a corresponding sheet name 71 displayed on the sheet selection screen 70 as needed between a selected state and an unselected state, by applying a predetermined operation (e.g., a tapping operation) to the touch panel 17. There is a check mark 72a displayed in the confirmation box 72 corresponding to the sheet name 71 of each sheet selected as a target sheet to be printed. Meanwhile, there is no check mark 72a displayed in the confirmation box 72 corresponding to the sheet name 71 of the sheet not selected as a target sheet to be printed. As shown in FIG. 2B, in the example, the two sheets identified by the sheet names "Sheet1" and "Sheet3,"

of the three sheets selectable as target sheets to be printed, are selected as target sheets to be printed.

Further, there is an enter button 73 displayed on the sheet selection screen 70. Hereinafter, the enter button 73 may be referred to as "the OK button 73." The sheets selected as target sheets to be printed are determined as target sheets to be printed, if the user applies a predetermined operation (e.g., a tapping operation) to the enter button 73.

FIG. 2C exemplifies the management list 80 generated by the conversion server 100. The management list 80 is configured to manage each piece of image data into which the conversion server 100 has converted each individual one of the sheets selected as target sheets to be printed from among all sheets contained in the target file to be printed. The management list 80 includes data 81 and data 82. The data 81 indicates the number of sheets converted by the conversion server 100, that is, the number of pieces of image data into which the conversion server 100 has converted the sheets selected as target sheets to be printed. The data 82 identifies each piece of image data acquired through the conversion, as target image data to be printed. FIG. 2C exemplifies the management list 80 including two pieces of data written there, which correspond to the two pieces of image data acquired through the conversion. The data 82 includes data 82a that defines a print order of each piece of image data acquired through the conversion, and data 82b that indicates a file name associated with the print order of each piece of image data acquired through the conversion.

In response to receipt of the management list 80 and the image data of each sheet from the conversion server 100, the terminal device 10 sequentially transmits the image data on a sheet-by-sheet to the MFP 30 and causes the MFP 30 to print the images based on the image data with the printing function, based on each piece of the data 82 included in the management list 80. Thus, even though receiving a plurality of pieces of image data corresponding to a plurality of sheets, the plurality of pieces of image data are managed by the management list 80 as a group of target pieces of imaged data to be printed. Therefore, the application 12b is allowed to treat the plurality of pieces of image data corresponding to the plurality of sheets as a group of target pieces of imaged data to be printed.

Subsequently, referring to FIGS. 3A, 3B, and 3C, detailed explanations will be provided about operations to be performed by the terminal device 10 and the conversion server 100 in the first illustrative embodiment. FIG. 3A is a flowchart showing an Excel file printing process to be executed by the CPU 11 of the terminal device 10 in accordance with the application 12b. The Excel file printing process is started when the application 12b is launched, and an Excel file is selected as a target file to be printed, on a file selection screen (not shown). In the following explanations of the Excel file printing process, an association between the flowchart shown in FIG. 3A and the sequence shown in FIG. 2A will be described as needed.

The CPU sets a first sheet of the sheets contained in the target file to be printed, as an intended sheet to be processed (S301). In the first illustrative embodiment, the Excel file selected as a target file to be printed is an XML-format file. Therefore, the CPU 11 is allowed to identify the sheets contained in the target file based on tags contained in the target file.

The CPU 11 analyzes the target file and determines whether the sheet currently in processing is a blank sheet without any data based on a user entry contained thereon (S302). When determining that the sheet currently in processing is not a blank sheet, i.e., that the sheet currently in processing contains data based on a user entry (S302: No), the CPU 11 acquires a sheet name of the sheet currently in processing from the target file, based on the tags contained in the target file (S303). Then, the CPU 11 displays, on the sheet selection screen 70, a sheet name 71 and a confirmation box 72 corresponding to the acquired sheet name (S304). It is noted that, at this stage, the sheet corresponding to the sheet name 71 displayed on the sheet selection screen 70 in S304 is not selected as a target sheet to be printed. Therefore, in the confirmation box 72 displayed in S304, a check mark 72a is not displayed.

After S304, the CPU 11 goes to S305. Meanwhile, when determining that the sheet currently in processing is a blank sheet (S302: Yes), the CPU 11 goes to S305 without executing S303 and S304. Hence, even though the sheet currently in processing is a sheet contained in the target file, when the sheet is a blank sheet without any data based on a user entry contained thereon, the sheet name 71 of the sheet is not displayed on the sheet selection screen 70. Namely, in the first illustrative embodiment, the application 12b is configured such that the user is not allowed to select a blank sheet as a target sheet to be printed.

The CPU 11 determines whether there is an unprocessed sheet to be processed over the steps S302 to S304, of the sheets contained in the target file (S305). When determining that there is an unprocessed sheet (S305: Yes), the CPU 11 sets a subsequent sheet as an intended sheet to be processed (S314), and then goes back to S302. Meanwhile, when determining that there is not an unprocessed sheet (S305: No), the CPU 11 waits for an entry of a user operation to indicate that selection of target sheets to be printed has been completed, i.e., the CPU 11 waits until the enter button 73 is operated (S306: No). While the CPU 11 is waiting for the enter button 73 to be operated, the user is allowed to operate the sheet selection screen 70 and select one or more target sheets to be printed, as needed, from among the sheets of which the sheet names 71 are displayed. It is noted that the CPU 11 performs a process for selecting target sheets to be printed (no shown) in parallel with the Excel file printing process.

When accepting an operation of the enter button 73 (S306: Yes, which corresponds to the step T1 in FIG. 2A), the CPU 11 stores a copy of the target file into the RAM 13, and generates a temporary file for printing (S307). The temporary file for printing, which is a copy of the XML-format Excel file, is an XML-format Excel file. The CPU 11 deletes data of one or more unselected sheets that have not been selected as target sheets to be printed, from the temporary file for printing (S308, which corresponds to the step T2 in FIG. 2A). The CPU 11 outputs the temporary file for printing with the data of the unselected sheets deleted therefrom in S308, to the wireless communication unit 21, and controls the wireless communication unit 21 to transmit the temporary file for printing to the conversion server 100 via the AP 50 and the Internet 800 (S309, which corresponds to the step T3 in FIG. 2A). When the conversion server 100 receives the temporary file for printing that has been transmitted by the terminal device 10 in S309, the controller 101 of the conversion server 100 performs an after-receipt-of-file process shown in FIG. 3B.

After S309, the CPU 11 waits until the wireless communication unit 21 receives, from the conversion server 100, a file ID corresponding to the temporary file for printing that has transmitted to the conversion server 100 (S310: No). When determining that the wireless communication unit 21 has received from the conversion server 100 a file ID corresponding to the temporary file for printing (S310: Yes), the CPU 11 acquires the file ID received by the wireless communication unit 21, from the wireless communication unit 21. Then, the CPU 11 outputs the acquired file ID and an image request to the wireless communication unit 21, and controls the wireless communication unit 21 to transmit the file ID and the image request to the conversion server 100 via the AP 50 and the Internet 800 (S311, which corresponds to the step T6 in FIG. 2A). When the conversion server 100 receives the image request transmitted from the wireless communication unit 21, the controller 101 of the conversion server 100 performs an after-receipt-of-request process shown in FIG. 3C, and transmits, to the terminal device 10, all pieces of image data corresponding to the file ID transmitted to the terminal device 10.

After S311, the CPU 11 waits until the wireless communication unit 21 receives the image data from the conversion server 100 (S312: No). When determining that the wireless communication unit 21 has received the image data from the conversion server 100 (S312: Yes), the CPU 11 acquires, from the wireless communication unit 21, the image data received by the wireless communication unit 21. The CPU 11 outputs the acquired image data and print settings stored in the flash memory 12 to the wireless communication unit 21, and controls the wireless communication unit 21 to transmit the image data and the print settings to the MFP 30 via the AP 50 (S313, which corresponds to the step T9 in FIG. 2A).

In the first illustrative embodiment, the terminal device 10 receives the image data as a ZIP file. Therefore, in S313, the CPU 11 decompresses the received ZIP file, and outputs the acquired imaged data to the wireless communication unit 21. Further, the received ZIP file contains the image data and the management list 80 for managing the image data. In S313, the CPU 11 sequentially outputs each piece of the image data to the wireless communication unit 21 in accordance with the management list 80. As a result of S313, the MFP 30 prints images based on the image data that the terminal device 10 has received from the conversion server 100, on printing sheets with the printing function. The image data that the terminal device 10 has received from the conversion server 100 is all pieces of image data corresponding to the single file ID, i.e., image data corresponding to all the sheets selected as target sheets to be printed. Therefore, as a result of S313, it is possible to acquire printed images that correspond to all the sheets selected as target sheets to be printed, respectively.

FIG. 3B is a flowchart showing the after-receipt-of-file process to be executed by the controller 101 of the conversion server 100 in accordance with a control program (not shown) stored in the conversion server 100. The after-receipt-of-file process is started when the conversion server 100 receives the Excel file (more specifically, the temporary file for printing) via the communication unit 102. In the following explanations of the after-receipt-of-file process, an association between the flowchart shown in FIG. 3B and the sequence shown in FIG. 2A will be described as needed.

The controller 101 generates the file ID of the temporary file for printing received via the communication unit 102 (S321). The controller 101 stores the received temporary file for printing into the storage unit (not shown) of the conversion server 100 in association with the generated file ID. Next, the controller 101 converts each sheet contained in the received temporary file for printing into JPEG image data, and stores the image data acquired through the conversion into the storage unit of the conversion server 100 in association with the file ID generated in S321 (S322, which corresponds to the step T4 in FIG. 2A). Subsequently, the controller 101 controls the communication unit 102 to transmit the file ID generated in S321 to the sending source (i.e., the terminal device 10) of the temporary file for printing (S323, which corresponds to the step T5 in FIG. 2A). Then, the controller 101 terminates the after-receipt-of-file process. As a result of S323, the CPU 11 of the terminal device 10, which has received the file ID, makes an affirmative determination in S310, i.e., makes a determination that the wireless communication unit 21 has received from the conversion server 100 the file ID corresponding to the temporary file for printing (S310: Yes).

FIG. 3C is a flowchart showing the after-receipt-of-request process to be executed by the controller 101 of the conversion server 100 in accordance with a control program (not shown) stored in the conversion server 100. The after-receipt-of-request process is started when the conversion server 100 receives the image request via the communication unit 102. In the following explanations of the after-receipt-of-request process, an association between the flowchart shown in FIG. 3C and the sequence shown in FIG. 2A will be described as needed.

The controller 101 generates the management list 80 for managing the image data of each sheet corresponding to the file ID received via the communication unit 102 together with the image request (S341, which corresponds to the step T7 in FIG. 2A). The controller 101 transmits the image data of each sheet corresponding to the file ID received via the communication unit 102 along with the image request, and the management list 80 generated in S341, to the requesting source (i.e., the terminal device 10) that has issued the image request (S342, which corresponds to the step T8 in FIG. 2A). Then, the controller 101 terminates the after-receipt-of-request process. In the first illustrative embodiment, in S342, the controller 101 transmits a ZIP file containing the image data and the management list 80 to the requesting source (i.e., the terminal device 10) that has issued the image request. As a result of S342, the CPU 11 of the terminal device 10, which has received the ZIP file, makes an affirmative determination in S312, i.e., makes a determination that the wireless communication unit 21 has received the image data from the conversion server 100 (S312: Yes).

According to the first illustrative embodiment, when an XML-format Excel file is selected as a target file, a file generated by deleting, from the target file, data of one or more unselected sheets that have not been selected by the user as target sheets to be printed, more specifically, a temporary file for printing is transmitted to the conversion server 100. Therefore, since data regarding the unselected sheets is not transmitted to the conversion server 100, it is possible to shorten a time period required for transmission of the temporary file for printing to the conversion server 100. Consequently, it is possible to reduce a time period required for the terminal device 10 to receive or acquire each piece of image data into which each individual one of the sheets contained in the temporary file for printing has been converted. Further, it is possible to reduce a time period required for printing of images based on the sheets selected as target sheets to be printed.

Further, according to the first illustrative embodiment, a sheet name of a blank sheet is not displayed on the sheet selection screen 70 such that the user is not allowed to select the blank sheet as a target sheet to be printed. Therefore, data of the blank sheet, which is not selected as a target sheet to be printed, is not transmitted to the conversion server 100. Thus, it is possible to avoid waste of time due to transmission of the data of the blank sheet, which is not worth being converted into image data, to the conversion server 100. Further, since the data of the blank sheet is not transmitted to the conversion server 100, it is possible to eliminate a time period for converting the blank sheet into image data in the conversion server 100. Thus, it is possible to avoid waste of time due to a useless operation related to the blank sheet that is not worth being converted into image data. Thereby, it is possible to reduce a time period required for the terminal device 10 to receive or acquire each piece of image data into which each individual sheet contained in the temporary file for printing has been converted, and to reduce a time period required for printing of the images based on the sheets selected as target sheets to be printed.

Subsequently, referring to FIG. 4, a second illustrative embodiment according to aspects of the present disclosure will be described. In the aforementioned first illustrative embodiment, the terminal device 10 is configured to generate a temporary file for printing that contains only one or more sheets selected as target sheets to be printed by deleting, from the target file to be printed, data of one or more unselected sheets that have not been selected as target sheets to be printed, and transmit the generated temporary file for printing to the conversion server 100. In contrast, in the second illustrative embodiment, the terminal device 10 is configured to generate, from the target file, divisional files each of which is an independent Excel file for a corresponding one of sheets selected as target sheets to be printed, and transmit the generated divisional files to the conversion server 100. In the second illustrative embodiment, the same elements as those in the aforementioned first illustrative embodiment will be provided with the same reference characters, and explanations thereof will be omitted.

FIG. 4A is a flowchart showing an Excel file printing process in the second illustrative embodiment. In the same manner as the first illustrative embodiment, the Excel file printing process of the second illustrative embodiment is configured to be executed by the CPU 11 in accordance with the application 12b. Hereinafter, explanations will be provided focusing mainly on differences from the Excel file printing process of the first illustrative embodiment (see FIG. 3A). After S301 to S305, and S312, when accepting an operation of the enter button 73 on the sheet selection screen 70 (S306: Yes), the CPU 11 generates, from the target file, a divisional file individually for each of the sheets selected as target sheets to be printed (S401). Specifically, the CPU 11 generates a divisional file of each sheet selected as a target sheet to be printed, by making a copy of data of each of the sheets selected as target sheets to be printed. Therefore, the number of the divisional files generated in S401 is identical to the number of the sheets selected as target sheets to be printed. It is noted that each divisional file is an XML-format Excel file.

The CPU 11 provides each of the generated divisional files with a file ID tag common to the divisional files (e.g., a tag corresponding to a file name of the original target file) (S402). Next, the CPU11 outputs all the divisional files provided with the common file ID tag and the number of the divisional files to the wireless communication unit 21, and controls the wireless communication unit 21 to transmit all the divisional files and the number of the divisional files to the conversion server 100 via the AP 50 and the Internet 800 (S403). The divisional files, transmitted to the conversion server 100, are provided with the common file ID tag. Therefore, the conversion server 100 is allowed to treat the divisional files received from the terminal device 10, as a single group. When the conversion server 100 receives the divisional files transmitted in S403, the controller 101 of the conversion server 100 performs an after-receipt-of-file process shown in FIG. 4B.

After S403, the CPU 11 waits until the wireless communication unit 21 receives, from the conversion server 100, a conversion completion notification informing that the divisional files have completely been converted into image data (S404: No). When determining that the wireless communication unit 21 has received the conversion completion notification from the conversion server 100 (S404: Yes), the CPU 11 acquires, from the wireless communication unit 21, the file ID received via the wireless communication unit 21 together with the conversion completion notification. Then the CPU 11 outputs the acquired file ID and an image request to the wireless communication unit 21, and controls the wireless communication unit 21 to transmit the file ID and the image request to the conversion server 100 via the AP 50 and the Internet 800 (S311). In the second illustrative embodiment, in the same manner as the first illustrative embodiment, when the conversion server 100 receives the image request transmitted in S311, the controller 101 of the conversion server 100 performs an after-receipt-of-request process shown in FIG. 3C. After S311, the CPU 11 performs S312 and S313, and then terminates the Excel file printing process of the second illustrative embodiment.

FIG. 4B is a flowchart showing an after-receipt-of-file process of the second illustrative embodiment to be executed by the controller 101 of the conversion server 100 in accordance with a control program (not shown) stored in the conversion server 100. The after-receipt-of-file process of the second illustrative embodiment is started when the communication unit 102 of the conversion server 100 receives the divisional files.

The controller 101 assigns, to a variable N that represents the number of unprocessed files, the number of the divisional files that has been received together with the divisional files (S421). The controller 101 sets a divisional file of the received divisional files as an intended file to be processed (S422). The controller 101 extracts a file ID from the divisional file currently in processing (S423). Specifically, since the divisional file is associated with the file ID tag, the controller 101 extracts the file ID based on the file ID tag. The controller 101 stores the received divisional file of each sheet into the storage unit (not shown) of the conversion server 100 in association with the file ID extracted in S423. The controller 101 converts the received divisional file of each sheet into JPEG image data, and stores the image data of each sheet acquired through the conversion into the storage unit of the conversion server 100 in association with the file ID extracted in S423 (S424). The controller 101 decrements the variable N by one (S425), and determines whether the variable N is equal to zero (S426). When determining that the variable N is not equal to zero (S426: No), the controller 101 determines that there is an unprocessed divisional file left, and sets a next divisional file as an intended file to be processed (S428). Then, the controller 101 goes back to S423. Meanwhile, when determining that the variable N is equal to zero (S426: Yes), the controller 101 determines that all the divisional files have been processed, and controls the communication unit 102 to transmit the file ID extracted in S423 and the conversion completion notification to the sending source (i.e., the terminal device 10) of the divisional files (S427). Thereafter, the controller 101 terminates the after-receipt-of-file process of the second illustrative embodiment. As a result of S427, the CPU 11 of the terminal device 10, which has received the file ID, makes an affirmative determination in S404, i.e., makes a determination that the wireless communication unit 21 has received the conversion completion notification from the conversion server 100 (S404: Yes).

According to the second illustrative embodiment, an independent divisional file is generated for each of the sheets selected as target sheets to be printed, and is transmitted to the conversion server 100. Therefore, in a manner similar to the aforementioned first illustrative embodiment, since one or more unselected sheets not selected as target sheets to be printed are not transmitted to the conversion server 100, it is possible to shorten a time period required for the temporary file for printing to be transmitted to the conversion server 100.

Subsequently, referring to FIG. 5, a third illustrative embodiment according to aspects of the present disclosure will be described. In the aforementioned first illustrative embodiment, the target sheets to be printed are selected by the user. In the third illustrative embodiment, one or more sheets other than blank sheets, of the sheets contained in the target file, are automatically selected as target sheets to be printed. In the third illustrative embodiment, the same elements as those in the aforementioned first illustrative embodiment will be provided with the same reference characters, and explanations thereof will be omitted.

FIG. 5 is a flowchart showing an Excel file printing process in the third illustrative embodiment. In the same manner as the first illustrative embodiment, the Excel file printing process of the third illustrative embodiment is configured to be executed by the CPU 11 in accordance with the application 12*b*. Hereinafter, explanations will be provided focusing mainly on differences from the Excel file printing process of the first illustrative embodiment (see FIG. 3A). In the third illustrative embodiment, the sheet selection screen 70 is not required to be displayed. Therefore, the steps S301 to S306, and S312 are unnecessary. Hence, in the Excel file printing process of the third illustrative embodiment, firstly, the CPU 11 stores a copy of the target file to be printed into the RAM 13, and generates a temporary file for printing (S307).

Next, the CPU 11 analyzes document data of the temporary file for printing, and determines whether the temporary file for printing contains one or more blank sheets (S501). When determining that the temporary file for printing contains one or more blank sheets (S501: Yes), the CPU 11 deletes data of the one or more blank sheets from the temporary file for printing (S502). The CPU 11 outputs the temporary file for printing from which the data of the one or more blank sheets has been deleted in S502 to the wireless communication unit 21, and controls the wireless communication unit 21 to transmit the temporary file for printing to the conversion server 100 via the AP 50 and the Internet 800 (S503). When the conversion server 100 receives the temporary file for printing transmitted by the terminal device 10 in S503, the controller 101 of the conversion server 100 performs the after-receipt-of-file process shown in FIG. 3B.

Meanwhile, in S501, when determining that the temporary file for printing does not contain any blank sheets (S501: No), the CPU 11 goes to S503 without executing S502. Therefore, when the temporary file for printing does not contain any blank sheets, all the sheets contained in the target file are identified as target sheets to be printed. After S503, the CPU 11 performs S310 to S313 in the same manner as the first illustrative embodiment, and then terminates the Excel file printing process of the third illustrative embodiment.

According to the third illustrative embodiment, the data of the one or more blank sheets is automatically deleted from the temporary file for printing. Therefore, since the data of the blank sheets is not transmitted to the conversion server 100, it is possible to shorten a time period required for transmission of the temporary file for printing. Further, since the data of the blank sheets is not transmitted to the conversion server 100, it is possible to eliminate a time period for converting the blank sheets into image data. Thus, it is possible to avoid waste of time due to a useless operation related to the blank sheets that are not worth being converted into image data. Thereby, it is possible to reduce a time period required for the terminal device 10 to receive or acquire each piece of image data into which each individual sheet contained in the temporary file for printing has been converted, and to reduce a time period required for printing of the images based on the sheets selected as target sheets to be printed.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modification>

In the aforementioned illustrative embodiments, the application 12*b* is installed in the terminal device 10. Nonetheless, the information processing device with the application 12*b* installed therein is not limited to the terminal device 10, and may be a personal computer or a tablet computer. Further, in the aforementioned illustrative embodiments, the terminal device 10 and the MFP 30 are different separate devices. Nonetheless, the terminal device 10 may be a printer having a printing function or a multi-function device having a printing function and another function. Further, in the aforementioned illustrative embodiments, the Android OS is exemplified as the OS 12*a* installed in the terminal device 10. Nonetheless, a different OS may be employed as the OS 12*a* installed in the terminal device 10.

In the aforementioned illustrative embodiments, the XML-format Excel file is exemplified as a file to be uploaded onto the conversion server 100 and converted into image data. Nonetheless, aspects of the present disclosure may be applied to a document file or document data that contains a plurality of sheets and is written in a markup language.

In the aforementioned first and second illustrative embodiments, a sheet name of a blank sheet is not displayed on the sheet selection screen 70. Nonetheless, a sheet name of a blank sheet may be displayed as a sheet name 71 on the sheet selection screen 70. Further, the criterion for determining whether to display a sheet name 71 on the sheet selection screen 70 is not limited to whether the sheet of the sheet name 71 is a blank sheet but may include a different criterion. A sheet satisfying a plurality of conditions or a sheet satisfying at least one of a plurality of conditions may be a sheet of which a sheet name 71 is to be displayed on the sheet selection screen 70, or may be a sheet of which a sheet name 71 is not to be displayed on the sheet selection screen 70. For instance, even though a sheet is a blank sheet, when a sheet name of the sheet is changed from a default value to a different value, the sheet name 71 of the sheet may be displayed on the sheet selection screen 70.

Likewise, in the aforementioned third illustrative embodiment, the criterion for determining a sheet to be excluded from target sheets to be printed is not limited to whether a sheet under examination is a blank sheet, but may include a different criterion. A sheet satisfying a plurality of conditions or a sheet satisfying at least one of a plurality of conditions may be excluded from target sheets to be printed.

In the aforementioned illustrative embodiments, the conversion server 100 is configured to transmit the file ID to the terminal device 10 after converting each sheet contained in the temporary file for printing into the image data. Nonetheless, the conversion server 100 may be configured to transmit the file ID to the terminal device 10 before the conversion. Further, the conversion server 100 may be configured to, when failing in the conversion, not transmit the file ID to the terminal device 10.

In the aforementioned illustrative embodiments, the terminal device 10 is configured to, after transmitting the temporary file for printing or the divisional files to the conversion server 100, automatically receive, from the conversion server 100, the image data acquired through the conversion. Nonetheless, the terminal device 10 may be configured to receive, from the conversion server 100, the image data acquired through the conversion, by, after receiving the file ID, transmitting the received file ID to the conversion server 100 as needed.

In the aforementioned first and third illustrative embodiments, the temporary file to be printed is acquired by deleting one or more unselected sheets or blank sheets from a copy of the target file. Nonetheless, the temporary file to be printed may be acquired by deleting one or more unselected sheets or blank sheets from the original target file. Further, in the aforementioned second illustrative embodiment, a divisional file of each sheet selected as a target sheet to be printed is generated by making a copy of data for each sheet selected as a target sheet to be printed. Nonetheless, a divisional file of each sheet selected as a target sheet to be printed may be generated by making copies of the target file of which the number corresponds to the number of sheets selected as target sheets to be printed and deleting unnecessary data from each copy such that each resulting file is the divisional file of each sheet selected as a target sheet to be printed.

A part of the steps shown in FIGS. 3A, 4A, and 5 may be omitted or modified within the scope of the inventive concept as expressed herein. For instance, instead of the steps S301 to S305, and S312, different steps of displaying sheets satisfying a predetermined condition or sheets not satisfying a predetermined condition on the sheet selection screen 70 may be employed. Further, the step (S303) of acquiring the sheet name may be omitted. Instead, information different from the sheet name may be displayed on the sheet selection screen 70. Further, instead of the steps S307 and S308, different steps of creating a temporary file for printing may be employed. Moreover, instead of S401, a different step of creating divisional files may be employed. Furthermore, instead of the steps S310 to S312, different steps of transmitting a request for image data to the conversion server 100 and receiving the image data may be employed. For instance, steps of transmitting a request for image data to the conversion server 100 and receiving the image data by using a file name of the original target file instead of the file ID may be employed. Further, instead of the step (S313) of printing the received image data, a step of storing the received image data may be employed.

In the aforementioned illustrative embodiments, the CPU 11 is configured to execute the steps shown in FIGS. 3A, 4A, and 5. Nonetheless, a plurality of CPUs may be configured to execute the steps shown in FIGS. 3A, 4A, and 5 in cooperation with each other. Further, an integrated circuit (such as an application specific integrated circuit) may be configured to execute the steps shown in FIGS. 3A, 4A, and 5 alone or in cooperation with one or more other integrated circuits. Furthermore, the CPU 11 and one or more integrated circuits may be configured to execute the steps shown in FIGS. 3A, 4A, and 5 in cooperation with each other.

What is claimed is:

1. An information processing device comprising:
a communication unit configured to communicate with a conversion device; and
a control unit configured to:
select one or more target spreadsheets from among a plurality of spreadsheets contained in target information,
the target information being described in a format of a markup language and containing the plurality of spreadsheets,
each of the plurality of spreadsheets being individually identified based on tag information contained in the target information;
generate transmission information, based on the one or more selected target spreadsheets,
the transmission information comprises a copy of information of each individual spreadsheet of the one or more selected target spreadsheets;
provide each piece of the generated transmission information with identification information common to each piece of the generated transmission information;
control the communication unit to transmit the generated transmission information, including the one or more pieces of document information each provided with the common identification information, to the conversion device; and
control the communication unit to receive a single group of one or more pieces of image information from the conversion device,
each of the one or more pieces of image information being generated through conversion by the conversion device based on a corresponding one of the one or more selected target spreadsheets included in the generated transmission information transmitted to the conversion device,
wherein each of the one or more pieces of the image information corresponds to each individual spreadsheet of the one or more selected target spreadsheets with the common identification information.

2. The information processing device according to claim 1, wherein the control unit comprises:
a processor coupled with the communication unit; and
a memory storing processor-executable instructions that, when executed by the processor, cause the processor to:
select the one or more target spreadsheets; generate the transmission information;
control the communication unit to transmit the generated transmission information to the conversion device; and
control the communication unit to receive the image information from the conversion device.

3. A method adapted to be implemented on a processor, comprising:
selecting one or more target spreadsheets from among a plurality of spreadsheets contained in target information,
the target information being described in a format of a markup language and containing the plurality of spreadsheets,
each of the plurality of spreadsheets being individually identified based on tag information contained in the target information;
generating transmission information, based on the one or more selected target spreadsheets, the transmission information comprises a copy of information of each individual spreadsheet of the one or more selected target spreadsheets;

providing each piece of the generated transmission information with identification information common to each piece of the generated transmission information;

transmitting the generated transmission information and the one or more pieces of document information each provided with the common identification information, to a conversion device; and receiving a single group of one or more pieces of image information from the conversion device, each of the one or more pieces of image information being generated through conversion by the conversion device based on a corresponding one of the one or more selected target spreadsheets included in the generated transmission information transmitted to the conversion device, wherein each of the one or more pieces of the image information corresponds to each individual spreadsheet of the one or more selected target spreadsheets with the common identification information.

4. A non-transitory computer-readable medium storing computer-readable instructions that are executable by a processor coupled with a communication unit configured to communicate with a conversion device, the instructions being configured to, when executed by the processor, cause the processor to:

select one or more target spreadsheets from among a plurality of spreadsheets contained in target information, the target information being described in a format of a markup language and containing the plurality of spreadsheets, each of the plurality of spreadsheets being individually identified based on tag information contained in the target information;

generate transmission information, based on the one or more selected target spreadsheets, the transmission information comprises a copy of information of each individual spreadsheet of the one or more selected target spreadsheets;

provide each piece of the generated transmission information with identification information common to each piece of the generated transmission information;

control the communication unit to transmit the generated transmission information, and the one or more pieces of document information each provided with the common identification information, to the conversion device; and control the communication unit to receive a single group of one or more pieces of image information from the conversion device, each of the one or more pieces of image information being generated through conversion by the conversion device based on a corresponding one of the one or more selected target spreadsheets included in the generated transmission information transmitted to the conversion device, wherein each of the one or more pieces of the image information corresponds to each individual spreadsheet of the one or more selected target spreadsheets with the common identification information.

5. The computer-readable medium according to claim 4, wherein the instructions are configured to, when executed by the processor, cause the processor to generate the transmission information by deleting, from the target information, information of one or more unselected spreadsheets that have not selected as the target spreadsheets.

6. The computer-readable medium according to claim 4, wherein the processor is coupled with an operation unit, and wherein the instructions are configured to, when executed by the processor, cause the processor to, when the operation unit accepts an operation designating one or more target spreadsheets from among the plurality of spreadsheets, select the one or more target spreadsheets designated by the operation.

7. The computer-readable medium according to claim 6, wherein the processor is coupled with a display unit, and wherein the instructions are configured to, when executed by the processor, cause the processor to:

acquire, from the target information, a plurality of pieces of name information that represent respective names of the plurality of spreadsheets each of which is individually identified based on the tag information;

control the display unit to display the names corresponding to the plurality of pieces of name information acquired from the target information; and when the operation unit accepts an operation designating one or more names of the displayed names, select the one or more target spreadsheets having the designated one or more names respectively.

8. The computer-readable medium according to claim 7, wherein the instructions are configured to, when executed by the processor, cause the processor to:

specify a spreadsheet, satisfying a predetermined condition, of the plurality of spreadsheets; and control the display unit to display one or more names of one or more spreadsheets other than the specified spreadsheet.

9. The computer-readable medium according to claim 8, wherein the spreadsheet satisfying the predetermined condition is a blank spreadsheet.

10. The computer-readable medium according to claim 4, wherein the instructions are configured to, when executed by the processor, cause the processor to:

specify a spreadsheet, satisfying a predetermined condition, of the plurality of spreadsheets;

wherein each of the one or more selected target spreadsheets does not include the specified spreadsheet.

11. The computer-readable medium according to claim 10, wherein the spreadsheet satisfying the predetermined condition is a blank spreadsheet.

12. The computer-readable medium according to claim 4, wherein the instructions are configured to, when executed by the processor, cause the processor to:

control the communication unit to receive a single group of management information and the one or more pieces of the image information, from the conversion device, wherein each of the one or more pieces of the image information corresponds to each individual spreadsheet of the one or more selected target spreadsheets included in the transmission information; and when receiving, via the communication unit, the single group of management information and the one or more pieces of the image information from the conversion device, control a printer accessible from the processor to print an image based on each of the received one or more pieces of image information, wherein all of the received one or more pieces of pieces of image information are managed based on the received management information.

13. The computer-readable medium according to claim 4, wherein the target information is described in an XML-format and contains Microsoft Excel® file.

14. The computer-readable medium according to claim 4, wherein the tag information is a character string that defines a document structure of the target information, and wherein the tag information is written in the markup language.

* * * * *